(12) United States Patent
Nishimura et al.

(10) Patent No.: US 10,607,761 B2
(45) Date of Patent: Mar. 31, 2020

(54) ATTACHMENT STRUCTURE FOR COIL DEVICES AND COIL DEVICE

(71) Applicant: IHI CORPORATION, Koto-ku, Tokyo (JP)

(72) Inventors: Kenji Nishimura, Tokyo (JP); Akio Ueda, Tokyo (JP)

(73) Assignee: IHI CORPORATION, Tokyo (JP)

( * ) Notice: Subject to any disclaimer, the term of this patent is extended or adjusted under 35 U.S.C. 154(b) by 42 days.

(21) Appl. No.: 15/547,415

(22) PCT Filed: Dec. 2, 2015

(86) PCT No.: PCT/JP2015/083916
§ 371 (c)(1),
(2) Date: Jul. 31, 2017

(87) PCT Pub. No.: WO2016/125378
PCT Pub. Date: Aug. 11, 2016

(65) Prior Publication Data
US 2018/0025826 A1 Jan. 25, 2018

(30) Foreign Application Priority Data
Feb. 2, 2015 (JP) ................. 2015-018720

(51) Int. Cl.
*H01F 27/02* (2006.01)
*H01F 27/06* (2006.01)
(Continued)

(52) U.S. Cl.
CPC ............... *H01F 27/06* (2013.01); *B60L 5/00* (2013.01); *B60L 50/50* (2019.02); *B60M 7/00* (2013.01);
(Continued)

(58) Field of Classification Search
CPC .......... H01F 27/06; H01F 27/02; H01F 38/14; B60L 11/182; B60L 11/18; B60L 5/00;
(Continued)

(56) References Cited

U.S. PATENT DOCUMENTS

2006/0192525 A1* 8/2006 Qin ..................... H01M 2/1066
320/107
2008/0143466 A1 6/2008 Monma
(Continued)

FOREIGN PATENT DOCUMENTS

CN 101047058 A 10/2007
CN 201369211 Y 12/2009
(Continued)

OTHER PUBLICATIONS

International Search Report mailed in corresponding International Patent Application No. PCT/JP2015/083916 dated Jan. 26, 2016, consisting of 5 pp. (English Translation Provided).
(Continued)

*Primary Examiner* — Mang Tin Bik Lian
(74) *Attorney, Agent, or Firm* — Volpe and Koenig, P.C.

(57) ABSTRACT

A fixing structure for a coil device according to an aspect of the disclosure is an attachment structure for a coil device which attaches a flat coil device including a coil portion to an attachment portion, the attachment structure including a cylindrical holding portion provided in the attachment portion to hold the coil device, and a cylindrical engaged portion provided in the coil device and engaged with the holding portion, wherein the holding portion and the engaged portion are disposed along an axis extending in a thickness direction of the coil device, and the engaged portion is engaged over an entire circumference thereof with the holding portion.

11 Claims, 12 Drawing Sheets

(51) Int. Cl.
*H01F 38/14* (2006.01)
*B60M 7/00* (2006.01)
*B60L 5/00* (2006.01)
*H02J 7/00* (2006.01)
*H02J 50/10* (2016.01)
*B60L 50/50* (2019.01)
*H02J 7/02* (2016.01)
*B60L 53/12* (2019.01)

(52) U.S. Cl.
CPC .............. *H01F 27/02* (2013.01); *H01F 38/14* (2013.01); *H02J 7/0042* (2013.01); *H02J 50/10* (2016.02); *B60L 53/12* (2019.02); *H02J 7/025* (2013.01)

(58) Field of Classification Search
CPC .......... B60M 7/00; H02J 7/0042; H02J 7/025; H02J 50/10; Y02T 10/7005
USPC ........... 336/199, 90; 323/359; 320/108, 109, 320/115; 307/104
See application file for complete search history.

(56) References Cited

U.S. PATENT DOCUMENTS

| | | | |
|---|---|---|---|
| 2010/0123452 A1 | 5/2010 | Amano | |
| 2010/0156345 A1* | 6/2010 | Phelps, III | H02J 50/10 320/108 |
| 2010/0290215 A1* | 11/2010 | Metcalf | A47B 21/00 362/127 |
| 2011/0062789 A1 | 3/2011 | Johnson et al. | |
| 2012/0161696 A1* | 6/2012 | Cook | B60L 11/182 320/108 |
| 2013/0057203 A1* | 3/2013 | Jones | H02J 50/10 320/108 |
| 2013/0181797 A1 | 7/2013 | Hickox | |
| 2013/0207478 A1 | 8/2013 | Metcalf et al. | |
| 2014/0361635 A1 | 12/2014 | Ookawa et al. | |
| 2015/0380969 A1* | 12/2015 | Malmberg | H02J 7/0047 320/108 |

FOREIGN PATENT DOCUMENTS

| | | |
|---|---|---|
| JP | 9-83414 A | 3/1997 |
| JP | 2008-87733 A | 4/2008 |
| JP | 2010-124522 A | 6/2010 |
| JP | 2010-182499 A | 8/2010 |
| JP | 2011-50127 A | 3/2011 |
| JP | 2011-204836 A | 10/2011 |
| JP | 2012-222956 A | 11/2012 |
| JP | 2012-254782 A | 12/2012 |
| JP | 2013-505582 A | 2/2013 |
| JP | 2013-153132 A | 8/2013 |
| WO | 2011/117714 A2 | 9/2011 |

OTHER PUBLICATIONS

Written Opinion mailed in corresponding International Patent Application No. PCT/JP2015/083916 dated Jan. 26, 2016, consisting of 4 pp.

* cited by examiner

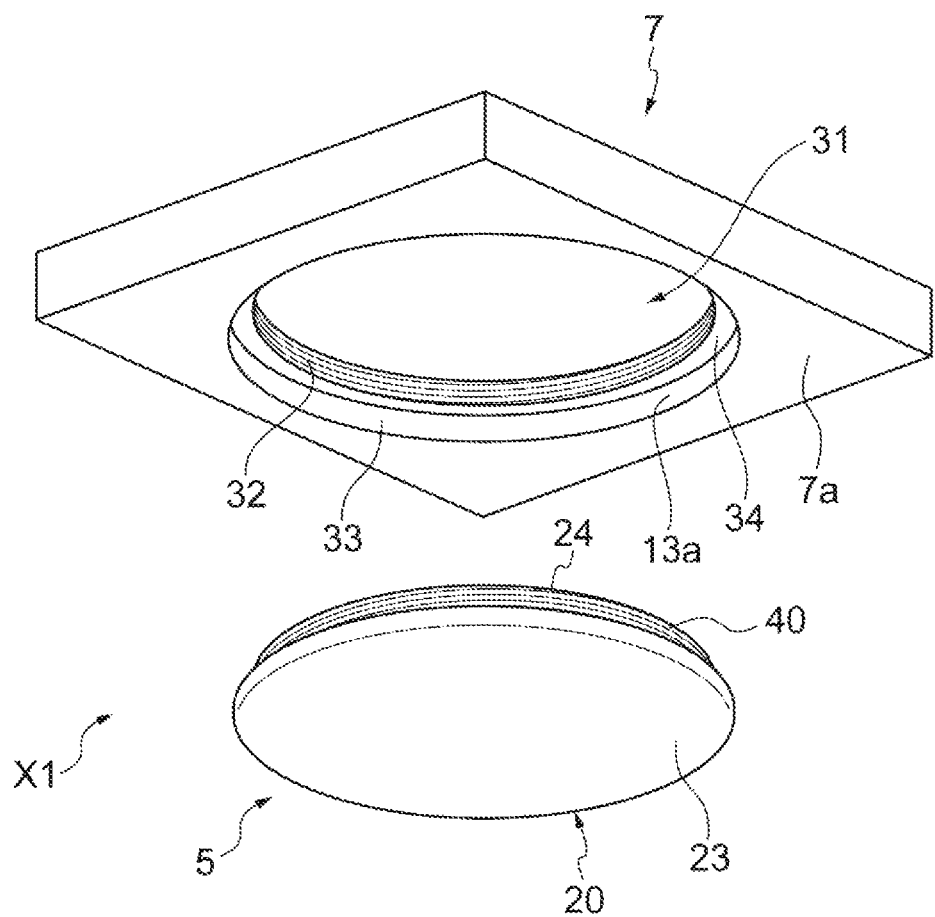

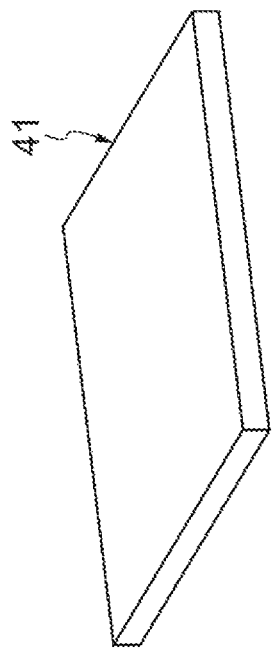
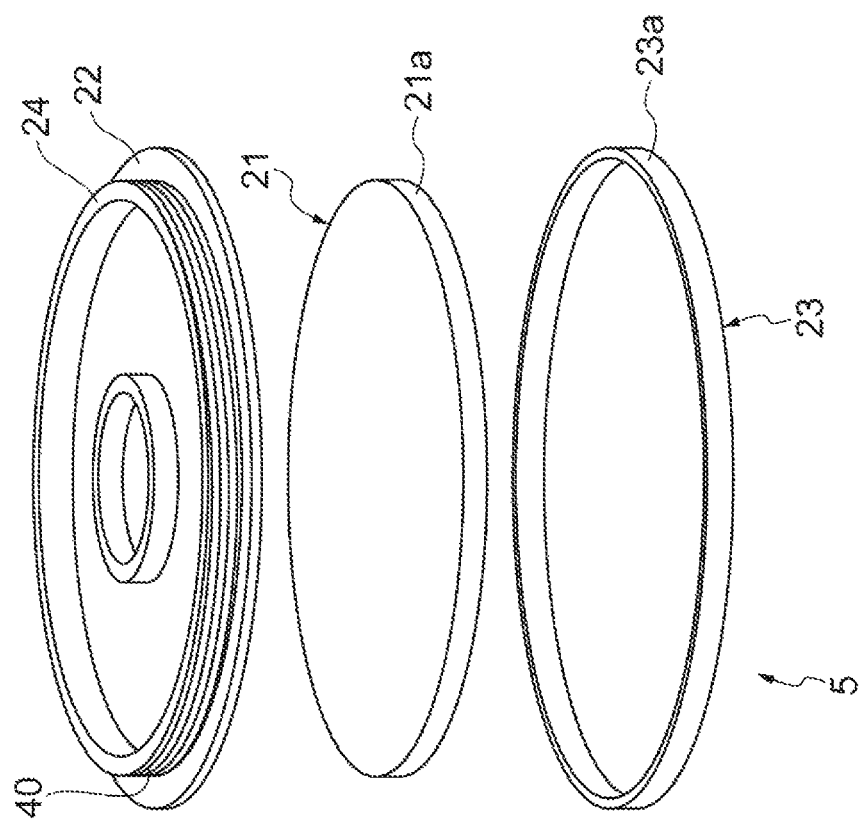

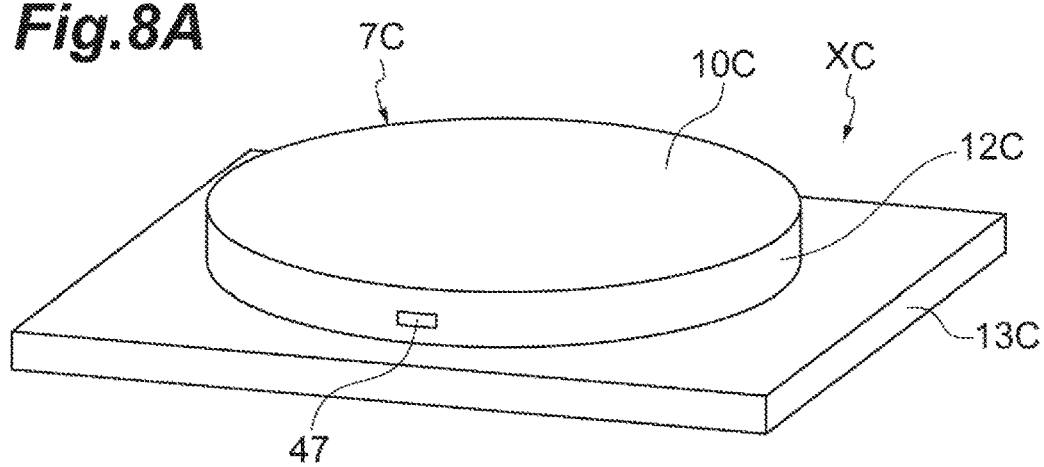
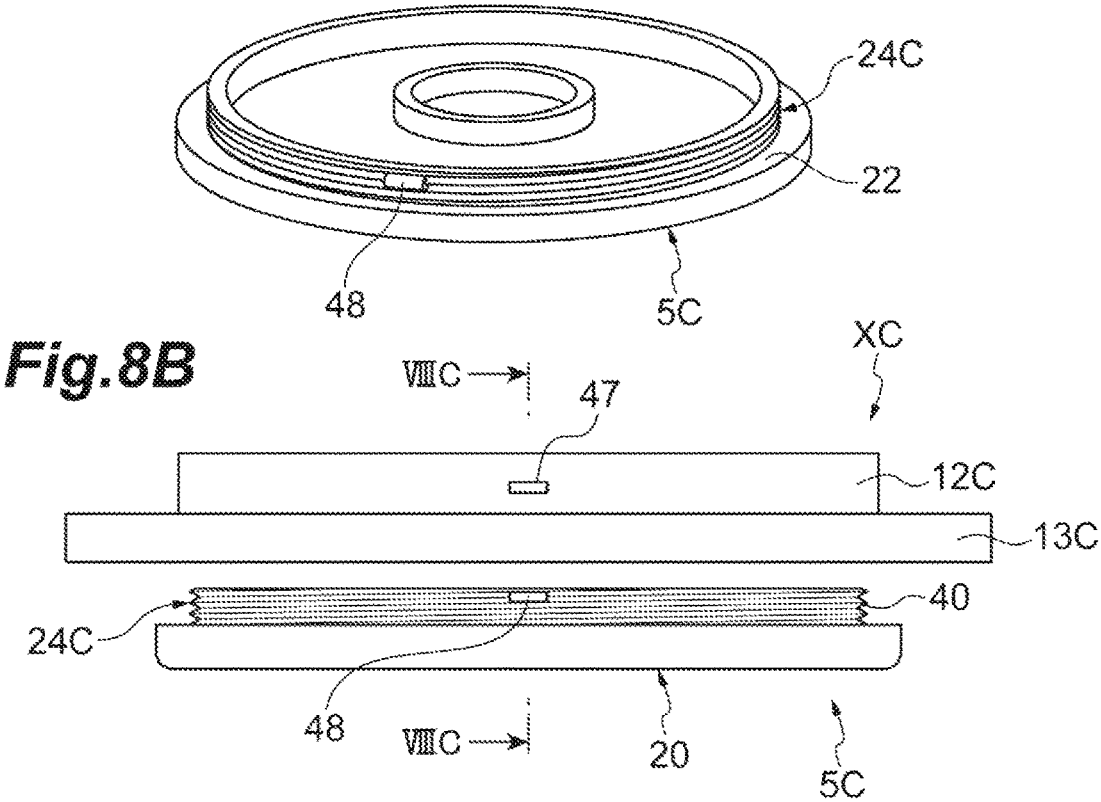
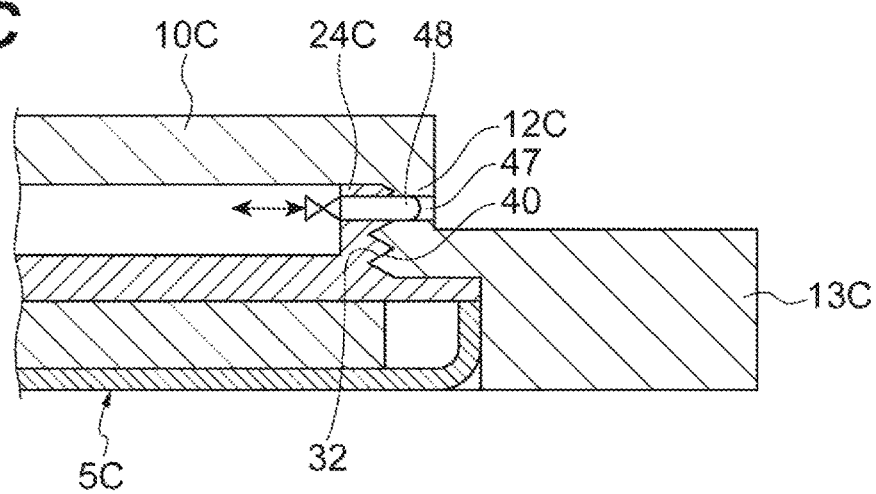

Fig.10
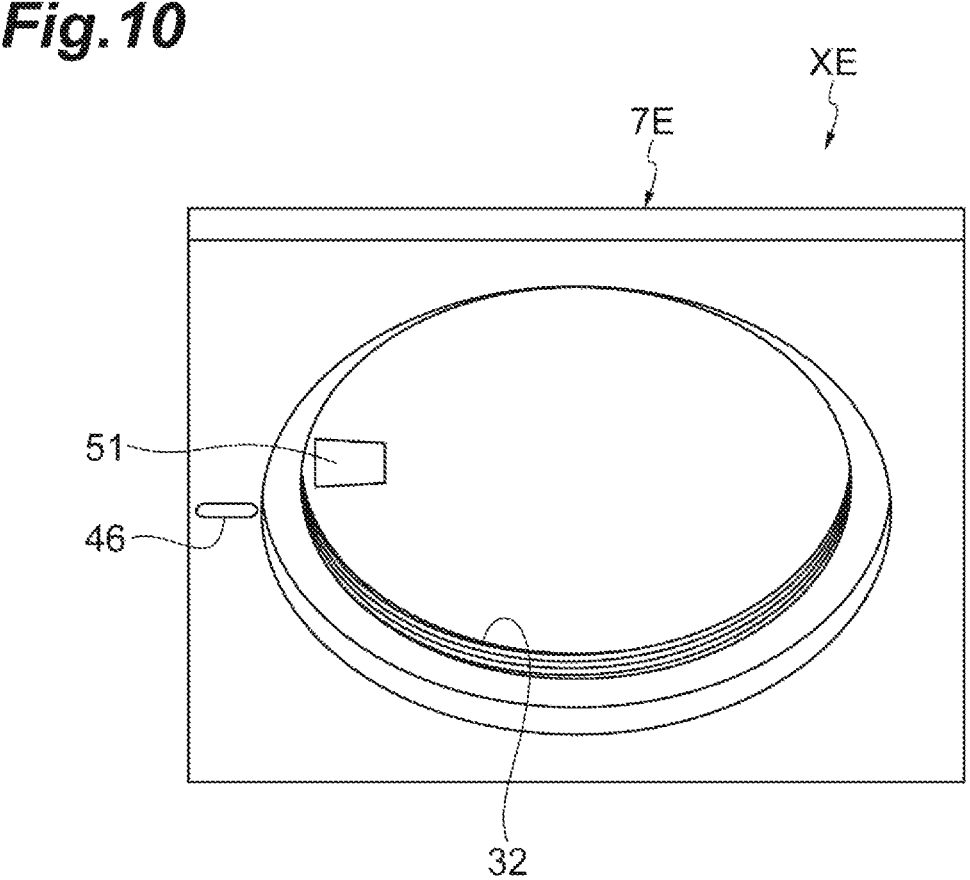
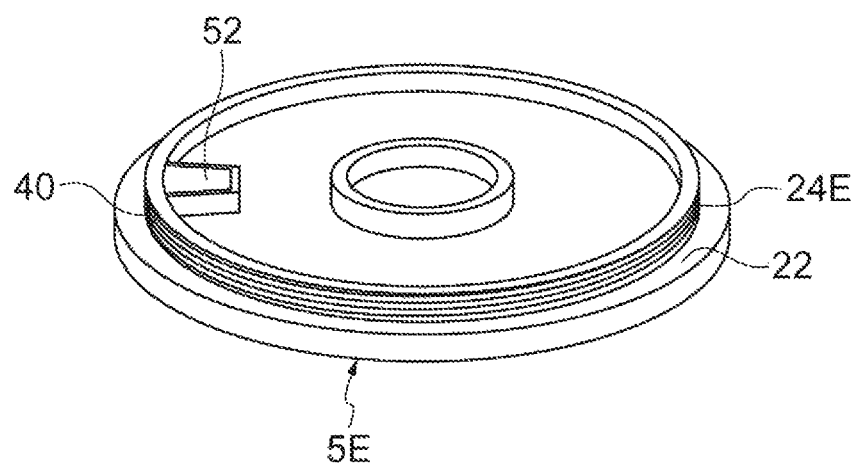

ATTACHMENT STRUCTURE FOR COIL DEVICES AND COIL DEVICE

TECHNICAL FIELD

The present disclosure relates to an attachment structure for a coil device, and a coil device. This application is based upon and claims the benefit of priority from the prior Japanese Patent Applications No. 2015-018720, filed on Feb. 2, 2015, the entire contents of which are incorporated herein by reference.

BACKGROUND ART

For example, a wireless power transfer system has been known as a system for charging a vehicle-driving battery of an electric vehicle, etc. In this system, a primary coil device (power transmission coil device) is installed on a ground side, a secondary coil device (power reception coil device) is installed on a vehicle side, and charging is performed by wirelessly transmitting power from the primary coil device to the secondary coil device using a principle of electromagnetic induction. For example, as described in Patent Literature 1, a primary coil device in which an electric wire is wound in a spiral shape on one side of a flat disc-shaped magnetic body core and a secondary coil device having the same configuration are disposed to face each other across a gap between coils thereof.

Various attachment structures for attaching such a coil device to a vehicle, etc. have been known. For example, in a structure described in Patent Literature 2, a mounting hole is provided in a cover made of a metal material, and a coil device is fixed to a vehicle using bolts, etc. In a structure described in Patent Literature 3, a coil device is fixed to a vehicle, or a coil device is fixed to a support member provided on a vehicle frame using bolts, etc.

CITATION LIST

Patent Literature

Patent Literature 1: Japanese Unexamined Patent Publication No. 2008-87733
Patent Literature 2: Japanese Unexamined Patent Publication No. 2013-153132
Patent Literature 3: Japanese Unexamined Patent Publication No. 2012-254782

SUMMARY

Technical Problem

When the above-described configuration is employed, a fixing force for fixing a coil device becomes a point load corresponding to each bolt. Then, when torsion or an external shock is applied to the coil device, there is a possibility that a force may not be dispersed, and load may be concentrated on and locally applied to a particular bolt. In this regard, there is a desire for an attachment structure capable of evenly dispersing a fixing force for a coil device, and for a coil device attachable using such a structure.

Solution to Problem

A fixing structure for a coil device according to an aspect of the disclosure is an attachment structure for a coil device which attaches a flat coil device including a coil portion to an attachment portion, the attachment structure including a cylindrical holding portion provided in the attachment portion to hold the coil device, and a cylindrical engaged portion provided in the coil device and engaged with the holding portion, wherein the holding portion and the engaged portion are disposed along an axis extending in a thickness direction of the coil device, and the engaged portion is engaged over an entire circumference thereof with the holding portion.

Effects

According to some aspects of the disclosure, it is possible to evenly disperse a fixing force for a coil device.

BRIEF DESCRIPTION OF DRAWINGS

FIG. 3 is an exploded perspective view of the attachment structure of FIG. 2.

FIG. 5A is an exploded perspective view of the coil device, and FIG. 5B is a perspective view of another coil portion applied instead of a coil portion in FIG. 5A.

FIG. 8A is an exploded perspective view of an attachment structure for a coil device according to a third embodiment, FIG. 8B is a side view of an attachment portion and the coil device of FIG. 8A, and FIG. 8C is a cross-sectional view of the attachment structure.

FIG. 10 is an exploded perspective view illustrating an attachment structure for a coil device according to a fifth embodiment.

DESCRIPTION OF EMBODIMENTS

Figure 1:
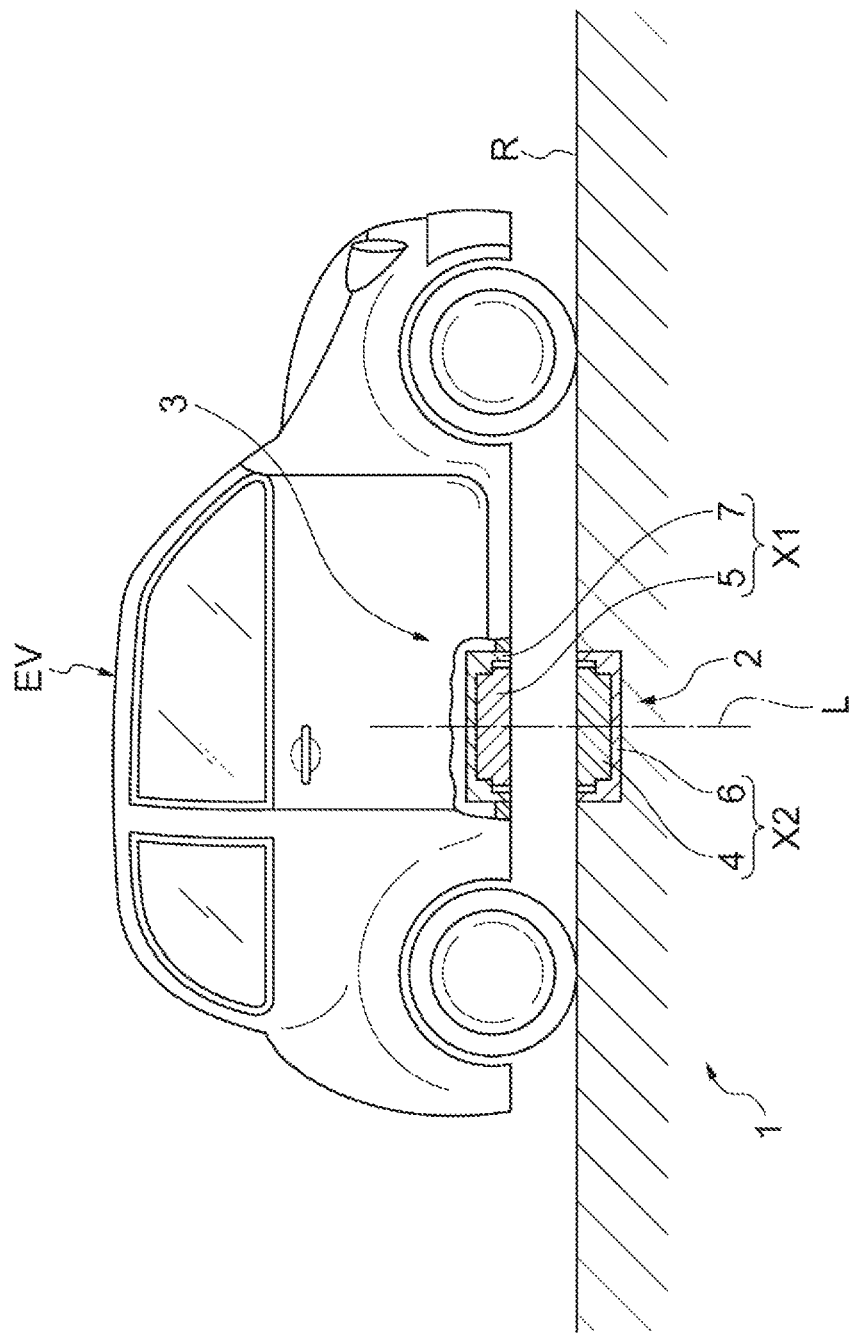
FIG. 1 is a diagram illustrating an application example of a coil device according to a first embodiment of the disclosure.

A fixing structure for a coil device according to an aspect of the disclosure is an attachment structure for a coil device which attaches a flat coil device including a coil portion to an attachment portion, the attachment structure including a cylindrical holding portion provided in the attachment portion to hold the coil device, and a cylindrical engaged portion provided in the coil device and engaged with the holding portion, wherein the holding portion and the engaged portion are disposed along an axis extending in a thickness direction of the coil device, and the engaged portion is engaged over an entire circumference thereof with the holding portion.

According to the fixing structure for a coil device, the cylindrical holding portion that holds the coil device is provided in the attachment portion to which the coil device is attached. Meanwhile, the cylindrical engaged portion engaged with the holding portion is provided in the coil device. The engaged portion of the coil device is engaged over the entire circumference thereof with the holding portion, and thus a fixing force for the coil device may be evenly dispersed. For example, when an external shock is generated in the coil device or the attachment portion, power thereof may be prevented from being concentrated on a particular position, and the power may be dispersed.

In some aspects, a screw portion is provided on a peripheral surface of the holding portion and on a peripheral surface of the engaged portion, respectively, and the coil device is fixed to the attachment portion by the engaged portion being screwed into the holding portion by rotation of the coil device around the axis. According to this configuration, when the coil device is rotated, the engaged portion is screwed into the holding portion, and the coil device is fixed to the attachment portion. Therefore, attachment of the coil device is easy.

In some aspects, the fixing structure for a coil device further includes a positioning portion for fixing the rotated coil device at a predetermined position. According to this configuration, the coil device may be attached such that a position of the coil portion in a rotation direction corresponds to an appropriate position.

In some aspects, the holding portion is provided in a region recessed from an end surface of the attachment portion in a direction of the axis, and a portion or a whole of the coil device in a thickness direction is buried inside the attachment portion. According to this configuration, since the holding portion is provided in the region recessed from the end surface of the attachment portion, a foreign material such as grit rarely enters a gap between the attachment portion and the coil device.

In some aspects, the holding portion with which the engaged portion is engaged, and a housing accommodation portion which has a larger diameter than a diameter of the holding portion and accommodates a portion or a whole of a housing of the coil device are provided in the attachment portion. According to this configuration, a foreign material such as grit rarely enters the gap between the attachment portion and the coil device. Further, since the portion or the whole of the housing of the coil device is accommodated in the housing accommodation portion, a length in which the coil device protrudes from the end surface of the attachment portion may be decreased.

In some aspects, a side end portion, the side end being in a direction orthogonal to the axis, of the coil portion accommodated in the housing is separated from a side surface portion of the housing in the orthogonal direction by a first gap, the side surface portion is separated from a peripheral surface of the housing accommodation portion in the orthogonal direction by a second gap, and the first gap is larger than the second gap. According to this configuration, the coil portion is separated from the attachment portion by the first gap. Thus, when the housing accommodation portion of the attachment portion corresponds to a magnetic member, a magnetic flux from the coil portion may be inhibited from being drawn into the housing accommodation portion. In addition, since the side surface portion of the housing is separated from the peripheral surface of the housing accommodation portion by the relatively small second gap, an effect that a foreign material is prevented from entering the gap increases.

A coil device according to an aspect of the disclosure is a flat coil device having a coil portion and being attached to an attachment portion, the coil device including a cylindrical engaged portion engaged with a cylindrical holding portion provided in the attachment portion, wherein the engaged portion is disposed along an axis extending in a thickness direction of the coil device, and configured to be engaged over an entire circumference thereof with the holding portion disposed along the axis.

The holding portion is provided in the attachment portion to which the coil device is attached, and the cylindrical engaged portion engaged with the holding portion provided in the coil device. Since the engaged portion is engaged over the entire circumference thereof with the holding portion, a fixing force for the coil device may be evenly dispersed. For example, when an external shock is generated in the coil device or the attachment portion, power thereof may be prevented from being concentrated on a particular position, and the power may be dispersed.

Hereinafter, embodiments of the disclosure will be described with reference to drawings. In description of the drawings, a like reference symbol will be assigned to a like component, and a repeated description will be omitted. Hereinafter, a description will be given of a case in which an attachment structure for a coil device according to the disclosure is applied to a coil device for wireless power transfer. The disclosure is not restricted to the coil device for wireless power transfer, and may be applied to, for example, an induction heating system.

A description will be given of a wireless power transfer system 1 to which a coil device and an attachment structure therefor of the present embodiment are applied with reference to FIG. 1. The wireless power transfer system 1 is a system for supplying power from a power transmitter 2 to a power receiver 3. For example, the power transmitter 2 and the power receiver 3 are separated from each other in a vertical direction. For example, the power transmitter 2 is installed on a road R of a parking lot, etc. For example, the power receiver 3 is mounted in an electric vehicle EV. The wireless power transfer system 1 is configured to supply power to the electric vehicle EV arriving at the parking lot, etc. using a magnetic resonance scheme, an electromagnetic induction scheme, etc.

The power transmitter 2 includes a power transmission coil device 4 for wireless power transfer buried in the road R of the parking lot, etc. The power transmission coil device 4 has a shape of a flat rectangular parallelepiped or a frustum. The power transmitter 2 generates desired alternating current (AC) power from a direct current (DC) power source or an AC power source, and transmits the generated AC power to the power receiver 3. The power transmitter 2 further includes a controller, an inverter, etc. (none of which is illustrated). For example, the power receiver 3 is attached to a bottom surface (chassis) of a vehicle body of the electric vehicle EV, and includes a power reception coil device 5 for wireless power transfer facing the power transmission coil device 4. The power reception coil device 5 has a shape of a flat rectangular parallelepiped or a frustum. The power receiver 3 receives power from the power transmitter 2, and supplies power to a load (for example, a battery). The power receiver 3 further includes a controller, a rectifier, etc. (none of which is illustrated). Hereinafter, the power transmission coil device 4 and the power reception coil device 5 will be referred to as a coil device 4 and a coil device 5, respectively.

In the wireless power transfer system 1, the coil device 4 is fixed to an attachment portion 6 provided on the road R. The coil device 5 is installed in the electric vehicle EV corresponding to a moving body. The power reception coil device 5 is fixed to an attachment portion 7 provided on the chassis of the electric vehicle EV, etc. An attachment structure X2 is configured by the coil device 4 and the attachment portion 6, and an attachment structure X1 is configured by the coil device 5 and the attachment portion 7. The attachment structure X2 and the attachment structure X1 have substantially the same configuration. The power transmission coil device 4 and the attachment portion 6 of the attachment structure X2 and the power reception coil device 5 and the attachment portion 7 of the attachment structure X1 are in planar symmetry with respect to a plane orthogonal to an axis L passing through centers thereof. A size and/or a shape of the coil device 4 may be different from a size and/or a shape of the power reception coil device 5. In this case, a size and/or a shape of the attachment portion 6 are different from a size and/or a shape of the attachment portion 7. In addition, in the power transmitter 2, the power transmission coil device 4 may be provided to protrude upward from the road R using another fixing scheme (not illustrated).

Hereinafter, a description will be given of the attachment structure X1 on the electric vehicle EV side. First, the coil device 5 will be described with reference to FIG. 4 and FIG. 5. The coil device 5 generates an induced current when a magnetic flux generated in the power transmission coil device 4 interlinks with the coil device 5. The coil device 5 includes a flat housing 20 and a flat coil portion 21 accommodated in the housing 20. The housing 20 includes a disc-shaped shield portion 22 to which the coil portion 21 is fixed, and a protective cover 23 having a bottomed cylindrical shape attached to a lower side of the shield portion 22. A cylindrical portion 24 having a slightly smaller diameter than that of the shield portion 22 is connected to an upper side of the shield portion 22. The cylindrical portion 24 protrudes upward (toward the vehicle side, that is, the attachment portion 7 side) from the shield portion 22.

Figure 4A:
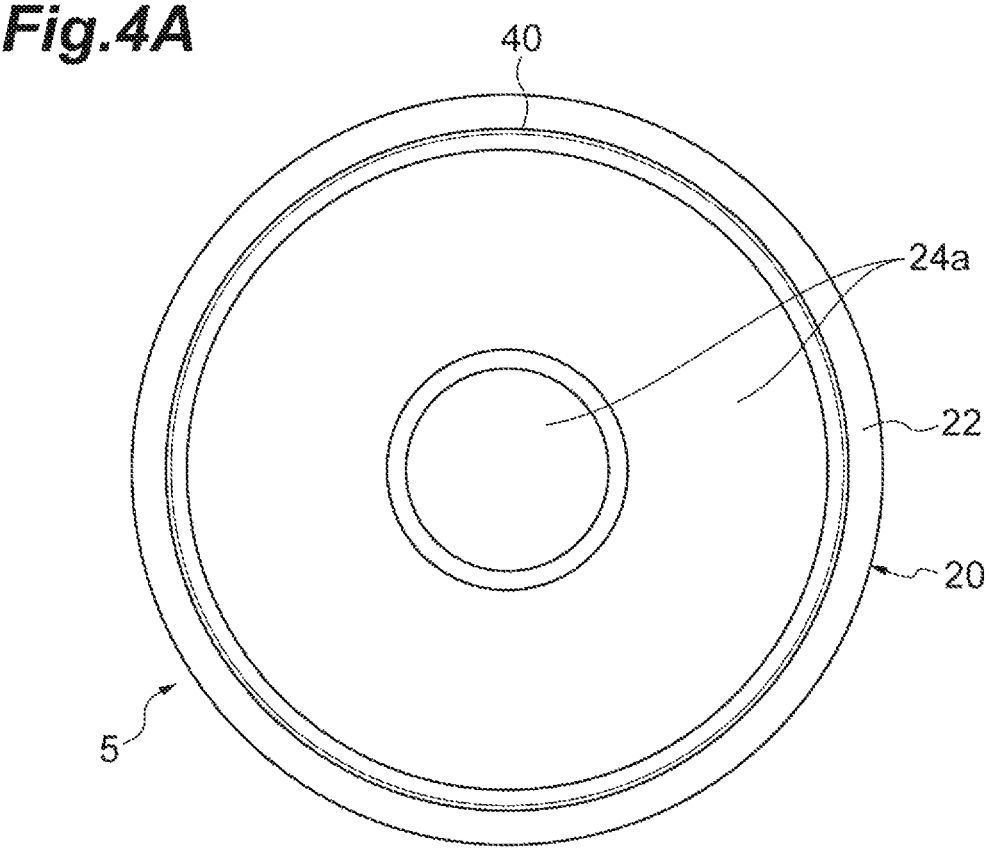
FIG. 4A is a plan view of the coil device.
Figure 4B:
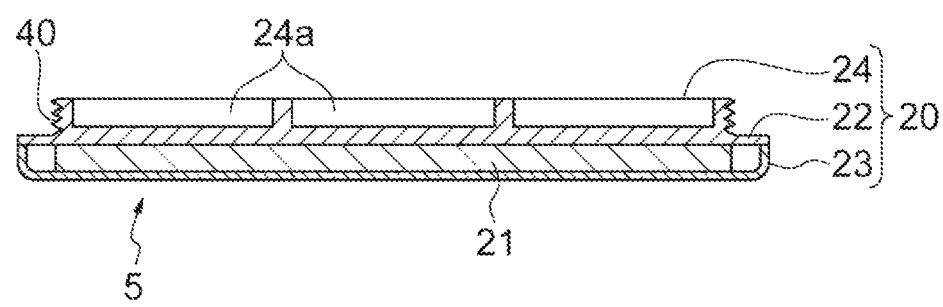
FIGS. 4B and 4C are cross-sectional views of the coil device.
Figure 4C:
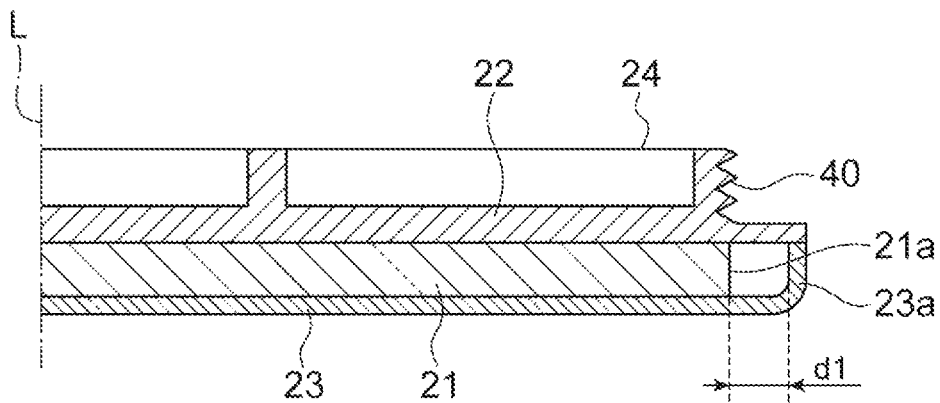

The shield portion 22 and the cylindrical portion 24 are integrally formed. The shield portion 22 and the cylindrical portion 24 are preferably made of a non-magnetic and conductive material, for example, aluminum or copper. When the shield portion 22 is formed using the non-magnetic and conductive material, the shield portion 22 has a function of inhibiting a magnetic flux between the coil devices 4 and 5 from being drawn into a magnetic member (chassis, etc.) not contributing to power feeding. The protective cover 23 is made of a magnetic flux transmitting and insulating material (for example, resin). The shield portion 22, the cylindrical portion 24, and the protective cover 23 are disposed around the axis L extending in a thickness direction of the housing 20 such that the axis L corresponds to a center. As illustrated in FIGS. 4A and 4B, a circular and annular space 24a is formed inside the cylindrical portion 24. For example, the space 24a is used as a storing space for a control device, etc. Even though the shield portion 22 forms a circular shape, a rectangular (polygonal) shield portion may be employed. In addition, the disclosure is not restricted to a case in which the shield portion 22 has a shield function. In terms of attachment of the coil devices 4 and 5, the shield portion 22 may be formed using resin, etc. and not have the shield function.

The coil portion 21 is configured to generate an induced current, and includes a thin plate-shaped magnetic body core (magnetic member), a coil wire (conductive wire), and a wire fixing frame (none of which is illustrated). The coil portion 21 forms a circular shape. As illustrated in FIG. 5B, a rectangular (polygonal) coil portion 41 may be used. The coil portion 21 may correspond to a solenoid type or a circular type. The coil portion 21 abuts the shield portion 22 of the housing 20, and is fixed thereto. The coil portion 21 is disposed such that the axis L corresponds to a center. The magnetic body core of the coil portion 21 reinforces electromagnetic coupling between the coil devices 4 and 5 using collection of a magnetic flux formed between the coil devices 4 and 5 and generation of a magnetic flux resulting from spontaneous magnetization.

As illustrated in FIG. 2 and FIG. 3, the attachment portion 7 corresponding to a frame to which the coil device 5 is fixed is provided in the attachment structure X1. The attachment portion 7 may be formed in the chassis, etc. of the electric vehicle EV, or manufactured as a separate body from the chassis, etc. and attached to the chassis, etc. The attachment portion 7 is made of a material capable of securing strength, for example, iron. The attachment portion 7 includes a base portion 10 disposed on an upper surface side and a cylindrical coil enclosing portion 11 connected to a lower side of the base portion 10. The base portion 10 and the coil enclosing portion 11 are integrally formed. A coil accommodation portion 31 for accommodating the coil device 5 is provided inside the coil enclosing portion 11.

The coil enclosing portion 11 includes a cylindrical holding portion forming portion 12 connected to the lower side of the base portion 10, and a cylindrical housing enclosing portion 13 connected to a lower side of the holding portion forming portion 12. An inner diameter of the housing enclosing portion 13 is larger than an inner diameter of the holding portion forming portion 12. The cylindrical portion 24 of the coil device 5 is accommodated in the holding portion forming portion 12. On a peripheral surface (inner circumferential surface) of the holding portion forming portion 12 facing the axis L, screw thread processing is performed, and a holding portion 32 in which a female screw portion is formed is provided. A housing accommodation portion 33 is formed inside the housing enclosing portion 13, and the shield portion 22 and the protective cover 23 of the coil device 5 are accommodated in the housing accommodation portion 33. A diameter of the housing accommodation portion 33 is larger than that of the holding portion 32. In this way, an annular stepped portion 34 facing downward is formed between the holding portion 32 and the housing accommodation portion 33.

In this way, the attachment portion 7 includes the holding portion 32 formed in a concave region. In other words, the holding portion 32 of the attachment portion 7 is provided in a region recessed (a region recessed upward) from a lower surface 7a (an end surface in the direction of the axis L) of the attachment portion 7.

Meanwhile, on an outer circumferential surface of the cylindrical portion 24 of the coil device 5, screw thread processing is performed, and an engaged portion 40 in which a male screw portion is formed is provided. The holding portion 32 and the engaged portion 40 are disposed along the axis L extending in a thickness direction of the coil device 5 (to surround the axis L), and the engaged portion 40 may be engaged with the holding portion 32 provided in the attachment portion 7. For example, the coil device 5 is gripped using a jig, and the engaged portion 40 is screwed into the holding portion 32 by being rotated around the axis L. In this way, the coil device 5 is fixed to the attachment portion 7. The engaged portion 40 is engaged with the holding portion 32, and the holding portion 32 holds the coil device 5 by this engagement. In this way, in the attachment structure X1 employing a screw structure, the engaged portion 40 is engaged over the entire circumference thereof with the holding portion 32.

Figure 2A:
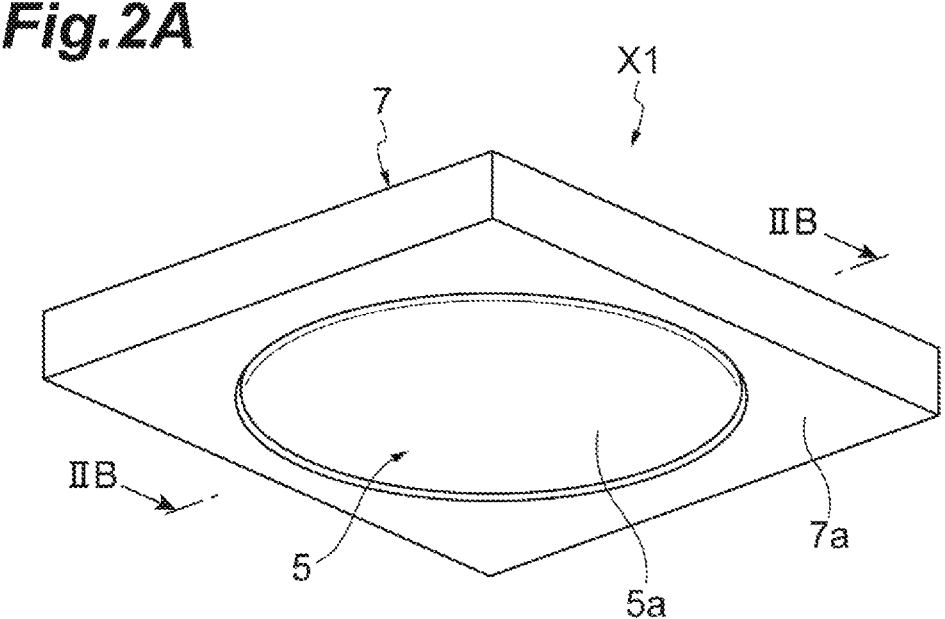
FIG. 2A is a perspective view illustrating an attachment structure for the coil device in FIG. 1.
Figure 2B:
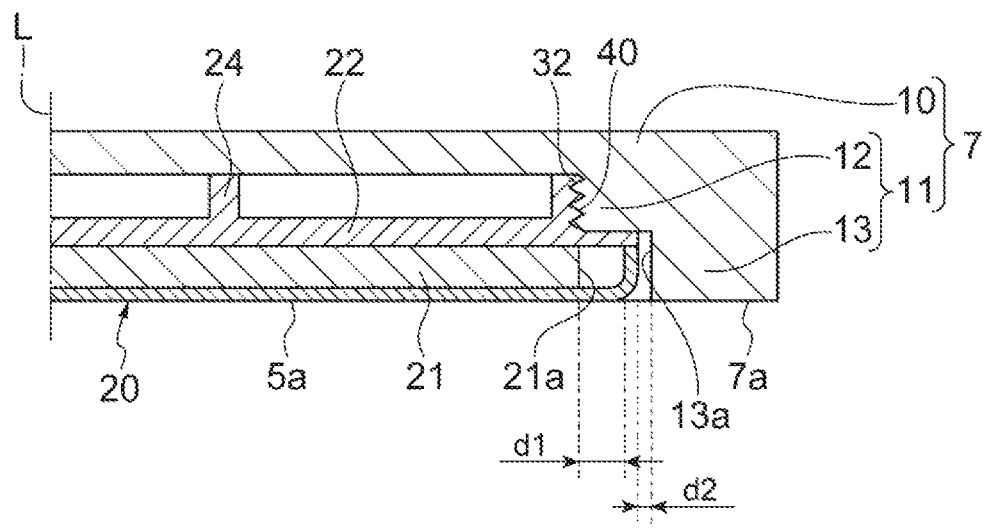
FIG. 2B is a cross-sectional view taken along IIB-IIB line of FIG. 2A.

While the coil device 5 is attached to the attachment portion 7, the whole coil device 5 in the thickness direction is accommodated in the coil accommodation portion 31 and buried inside the attachment portion 7. More specifically, the whole housing 20 of the coil device 5 is accommodated in the housing accommodation portion 33. As illustrated in FIGS. 2A and 2B, a surface 5a of the coil device 5 is flush with the lower surface 7a of the attachment portion 7.

As illustrated in FIG. 2B, a side end portion 21a (a side end portion in a direction orthogonal to the axis L) of the coil portion 21 accommodated in the housing 20 is separated from a side surface portion 23a (see FIG. 4C) of the protective cover 23 by a first gap d1 in the orthogonal direction (left-right direction in the figure). The side surface portion 23a of the protective cover 23 is separated from an inner circumferential surface 13a of the housing enclosing portion 13 (peripheral surface of the housing accommodation portion 33) by a second gap d2 (see FIG. 2B) in the orthogonal direction. Herein, the first gap d1 is larger than the second gap d2. According to this configuration, a gap between the housing 20 and the housing enclosing portion 13 is made as small as possible to prevent a foreign material such as dirt, grit, etc. from entering the gap. Further, the side end portion 21a of the coil portion 21 is separated from the housing enclosing portion 13 (the attachment portion 7) made of iron by a certain distance, thereby reducing an adverse effect on a magnetic flux between the coil devices 4 and 5 depending on the material type of the housing enclosing portion 13.

According to the coil device 5 and the attachment structure X1 therefor described above, the cylindrical holding portion 32 that holds the coil device 5 is provided in the attachment portion 7 of the electric vehicle EV to which the flat coil device 5 is attached, and the cylindrical engaged portion 40 engaged with the holding portion 32 is provided in the coil device 5. The engaged portion 40 of the coil device 5 is engaged over the entire circumference thereof with the holding portion 32, and thus a fixing force for the coil device 5 is dispersed evenly (that is, radially over the entire circumference). For example, when an external shock is applied to the attachment portion 7 of the electric vehicle EV, a force thereof may be prevented from being concentrated on several regions, and the force may be dispersed. In addition, when several places of a flat coil device are fixed using bolts as in the past, there is a possibility that a balance (dynamic balance) of a fixing force may be lost due to damage to a bolt hole or a bolt. According to the above-described configuration, such a possibility is eliminated. In addition, a plurality of captive screws, which has been necessary in the past, is unnecessary, a working property is improved, and errors at the time of processing are reduced. Furthermore, a retaining error does not occur.

Since the coil device 5 is fixed to the attachment portion 7 when the coil device 5 is rotated and the engaged portion 40 is screwed into the holding portion 32, attachment of the coil device 5 is easy.

The holding portion 32 is provided in the region recessed from the lower surface 7a of the attachment portion 7, and thus a foreign material such as dirt, grit, etc. rarely enters a gap between the attachment portion 7 and the coil device 5. In this way, an engaged part of the holding portion 32 and the engaged portion 40 is hidden from an exterior view, and thus a state in which a foreign material is attached to the engaged part, and the coil device 5 may not be removed does not occur.

Since the housing accommodation portion 33 is provided in the attachment portion 7, a foreign material such as dirt, grit, etc. rarely enters the gap between the attachment portion 7 and the coil device 5. Further, since the whole housing 20 of the coil device 5 is accommodated in the housing accommodation portion 33, a length in which the coil device 5 protrudes from the lower surface 7a of the attachment portion 7 may be decreased. When the coil device 5 is flush with the lower surface 7a of the attachment portion 7 as described above, air resistance is reduced when the electric vehicle EV is driven. In addition, the coil device 5 may be prevented from touching a projection on a road such as a curb.

According to the coil enclosing portion 11 having a double layer structure of the holding portion forming portion 12 and the housing enclosing portion 13 having different inner diameters, the holding portion 32 in which the screw portion is formed is provided in an inner part, and thus the space 24a on the inside of the cylindrical portion 24 in a second layer may be used as a storing space for a precision instrument such as a controller, and such a precision instrument may be protected from an external shock.

In addition, the coil portion 21 is separated from the attachment portion 7 by the first gap d1. When the attachment portion 7 corresponds to a magnetic member such as iron, there is a possibility that a magnetic flux from the coil portion 21 may be drawn into the attachment portion 7 which does not contribute to power feeding. In this regard, in the attachment structure X1, when the coil portion 21 and the attachment portion 7 are separated from each other, a flow of a magnetic flux between the coil devices 4 and 5 is rarely disordered when compared to a case in which the coil portion 21 and the attachment portion 7 are adjacent to each other. In addition, since the side surface portion 23a of the housing 20 is separated from the inner circumferential surface 13a of the housing enclosing portion 13 (peripheral surface of the housing accommodation portion 33) by the relatively small second gap d2, an effect that a foreign material is prevented from entering the gap increases.

Figure 6:
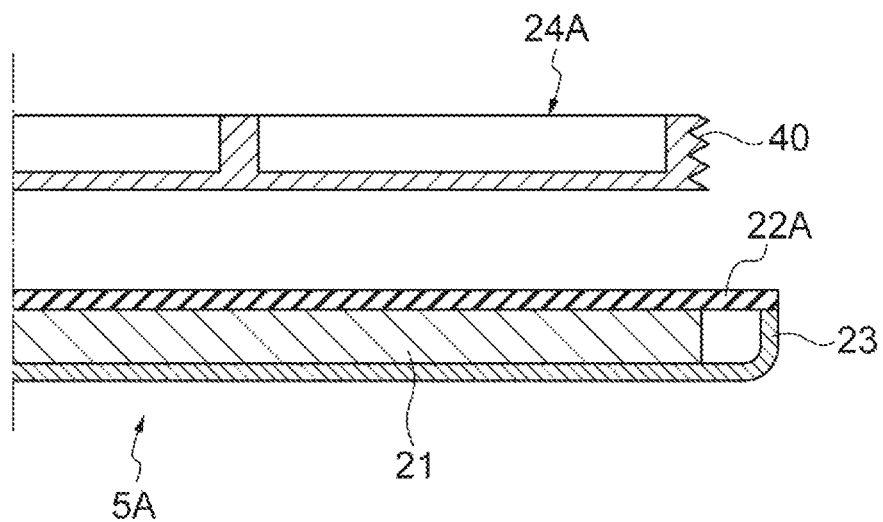
FIG. 6 is a cross-sectional view illustrating a modified example of the coil device.

Next, a description will be given of a modified mode of the coil device with reference to FIG. 6. As illustrated in FIG. 6, it is possible to employ a coil device 5A in which a cylindrical portion 24A and a shield portion 22A are configured as separate bodies. The cylindrical portion 24A including an engaged portion 40 in which a screw portion is formed may be made of the above-mentioned metal material or another material. The cylindrical portion 24A may be formed using iron, etc. to ensure strength of the cylindrical portion 24A. Alternatively, weight lightening may be attempted by forming the cylindrical portion 24A using resin, etc. Further, the shield portion 22A may be made of resin, and the cylindrical portion 24A may be made of aluminum, thereby assigning a shield function only to the cylindrical portion 24A.

Figure 7A:
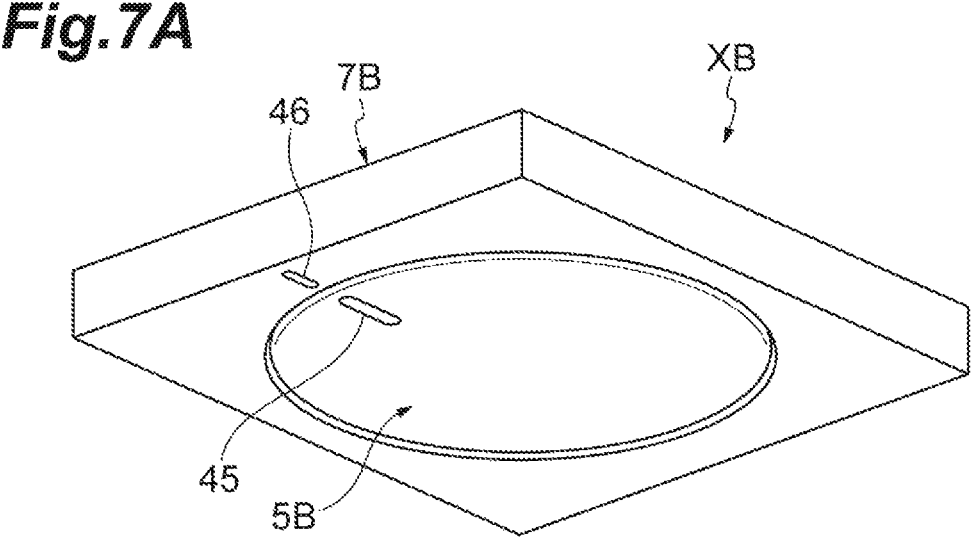
FIG. 7A is a perspective view illustrating an attachment structure for a coil device according to a second embodiment.
Figure 7B:
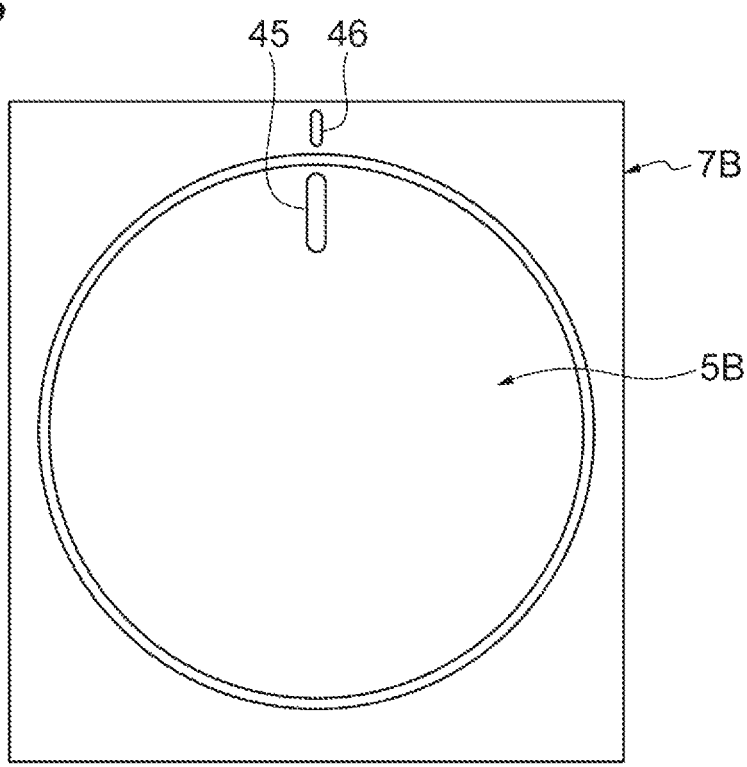
FIG. 7B is a bottom view of FIG. 7A.

Next, a description will be given of an attachment structure XB according to a second embodiment with reference to FIG. 7. In the above-described embodiment, the coil portion 21 of the coil device 5 may correspond to the solenoid type or the circular type. When the circular-type coil portion 21 is employed, a position in a rotation direction around the axis L may not be strictly controlled. However, in the case of an extraction direction of a wire or in which a shape of the coil portion 21 does not correspond to a perfect circle and corresponds to an ellipse, a rectangle, etc., a predetermined directivity may be necessary. Meanwhile, when the solenoid-type coil portion 21 is employed, and when the coil portion 21 is rotated by 90 degrees around the axis L, a direction of a magnetic flux line is different. Thus, a position of the coil portion 21 in the rotation direction is significant.

In this regard, in the embodiment below, a positioning portion for determining a position of a coil device in a rotation direction is provided. The positioning portion is used to fix a rotated coil device 5B at a predetermined position. In more detail, the positioning portion is configured such that positioning of the coil device 5B in the rotation direction is performed when the coil device 5B is attached to an attachment portion 7B. In the embodiment below, when the positioning portion is provided, the coil device 5B, etc. may be easily attached such that a position of the coil portion 21 in the rotation direction corresponds to an appropriately position. As illustrated in FIG. 7, the attachment structure XB that includes the coil device 5B provided with a mark 45 and the attachment portion 7B provided with a mark 46 corresponding to the mark 45 may be employed as an aspect of the disclosure. In this case, for example, a loosening prevention screw thread may be formed in a holding portion 32 and an engaged portion 40 such that rotation of the coil device 5 stops at a target position (a position at which the mark 45 matches the mark 46) when the device 5 is screwed at specified torque. The loosening prevention screw thread prevents reverse rotation and deviation of fixing resulting from vibration, etc. In the present embodiment, the mark 45, the mark 46, and the holding portion 32 and the engaged portion 40 having the loosening prevention screw thread correspond to the positioning portion.

Next, a description will be given of an attachment structure XC according to a third embodiment with reference to FIG. 8. As illustrated in FIG. 8, as an aspect of the disclosure, it is possible to employ the attachment structure XC including an attachment portion 7C, which includes a holding portion forming portion 12C provided with a groove portion 47 for positioning on an outer circumferential surface, a base portion 10C, and a housing enclosing portion 13C, and a coil device 5C provided with a push block 48 on an outer circumferential surface of a cylindrical portion 24C. For example, the push block 48 includes a spring and attempts to return to a home position due to an elastic force when the push block 48 is pushed. In this case, when the coil device 5C is rotated in a screw direction while the push block 48 is pushed, and the push block 48 moves up to a position of the groove portion 47, the push block 48 is inserted into the groove portion 47 by an elastic force thereof. In this way, the coil device 5C is fixed. The push block 48 may move forward and backward by a spring force. When the coil device 5C is removed, a jig is put into the groove portion 47 in a lateral direction to push and release the push block 48 from the groove portion 47. In the present embodiment, the push block 48 and the groove portion 47 correspond to a positioning portion.

Figure 9A:
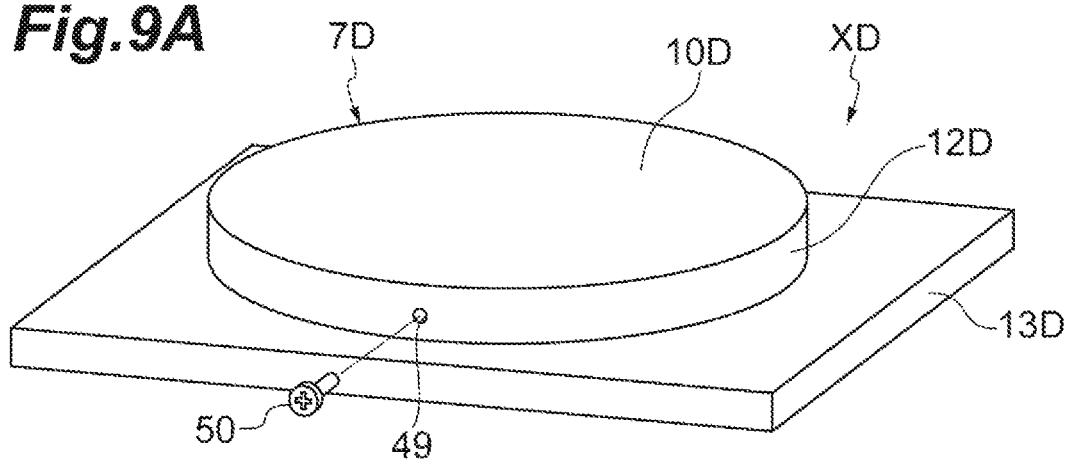
FIG. 9A is an exploded perspective view of an attachment structure for a coil device according to a fourth embodiment.
Figure 9B:
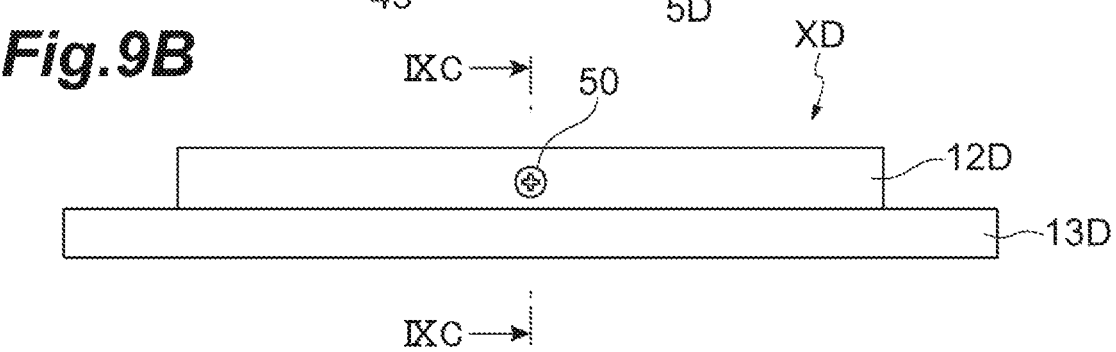
FIG. 9B is a side view of the attachment structure of FIG. 9A.
Figure 9C:
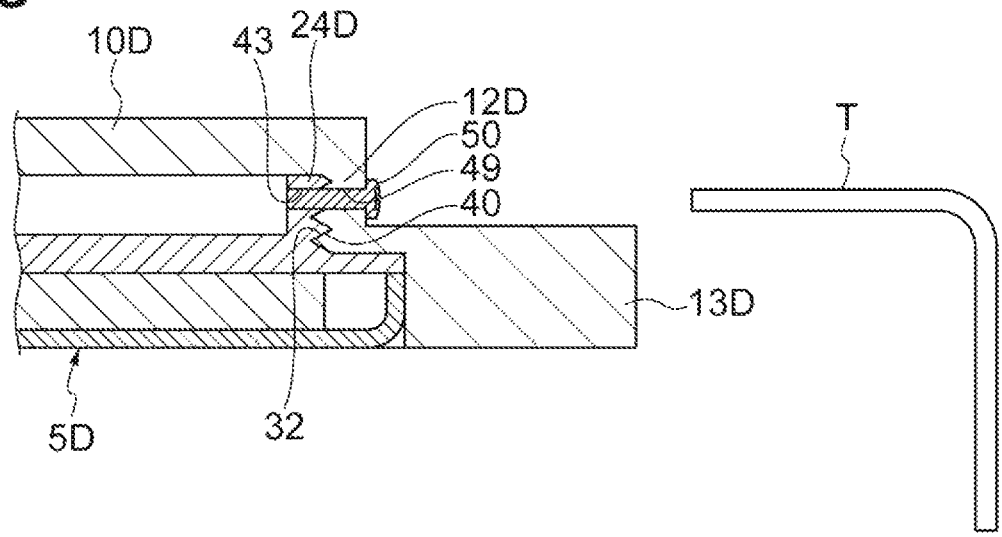
FIG. 9C is a cross-sectional view of the attachment structure.

Next, a description will be given of an attachment structure XD according to a fourth embodiment with reference to FIG. 9. As illustrated in FIG. 9, as an aspect of the disclosure, it is possible to employ the attachment structure XD including an attachment portion 7D, which includes a holding portion forming portion 12D provided with a screw hole portion 49 for locking on an outer circumferential surface, a base portion 10D, and a housing enclosing portion 13D, and a coil device 5D which includes a cylindrical portion 24D providing with a screw hole portion 43 for locking on an outer circumferential surface. In this case, the coil device 5D is rotated in a screw direction, and the attachment portion 7D and the coil device 5D are fastened together at a point at which the screw hole portion 49 matches the screw hole portion 43 using a locking screw 50 and a jig T, thereby preventing reverse rotation and deviation of fixing of the coil device 5D. When the coil device 5D is removed, the coil device 5D is loosened using the jig T in a lateral direction. In the present embodiment, the screw hole portion 43, the screw hole portion 49, and the locking screw 50 correspond to a positioning portion.

Next, a description will be given of an attachment structure XE according to a fifth embodiment with reference to FIG. 10. As illustrated in FIG. 10, as an aspect of the disclosure, it is possible to employ the attachment structure XE including an attachment portion 7E provided with a magnet 51 and a coil device 5E which includes a cylindrical portion 24E provided with a magnet 52 at a position corresponding to the magnet 51. In this case, a shield portion 22 of the coil device 5E and the attachment portion 7E correspond to aluminum, resin, etc. not having a magnetic property. When the coil device 5E is fastened to a certain extent, an attracting force is generated by magnetic forces of the magnets, and the coil device 5E is fixed at a positioning point. A force resulting from the magnet 51 and the magnet 52 has strength at which movement does not occur by specific vibration or power. When the coil device 5E is removed, the magnetic force is weakened by demagnetization, etc. In the present embodiment, the magnet 51 and the magnet 52 correspond to a positioning portion.

Figure 11A:
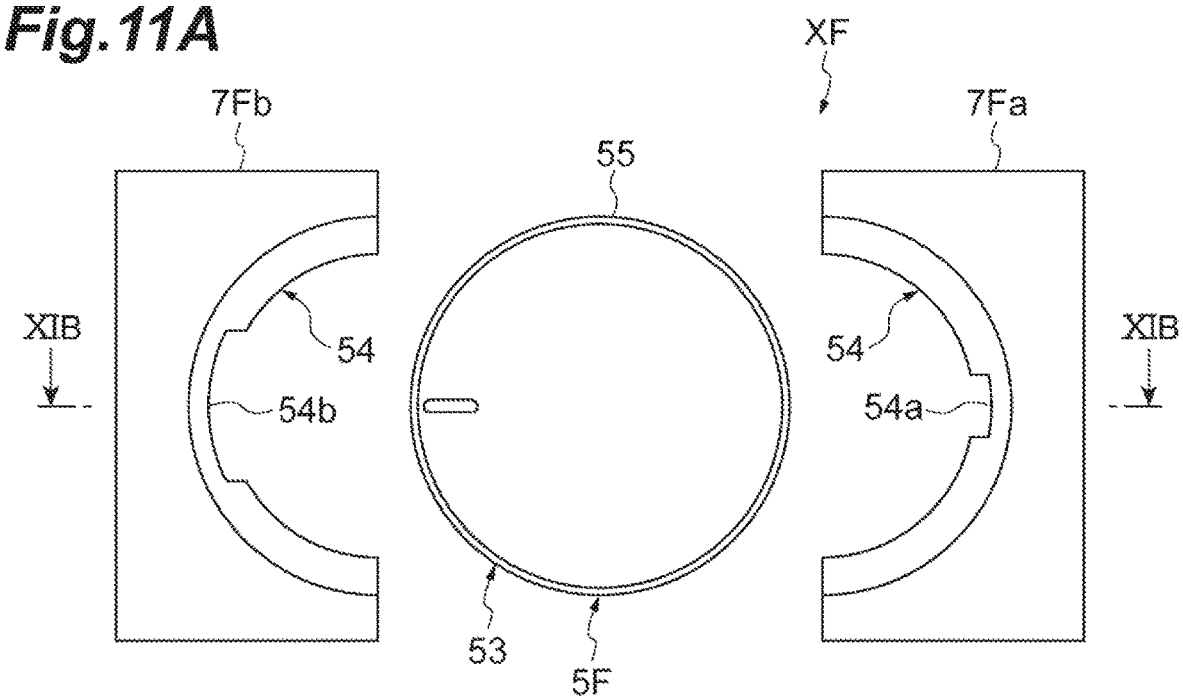
FIG. 11A is a bottom view illustrating an exploded view of an attachment structure for a coil device according to a sixth embodiment.
Figure 11B:
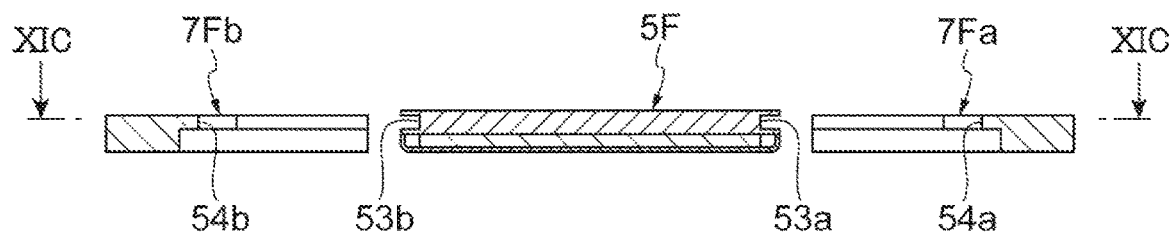
FIG. 11B is a cross-sectional view taken along XIB-XIB line of FIG. 11A.
Figure 11C:
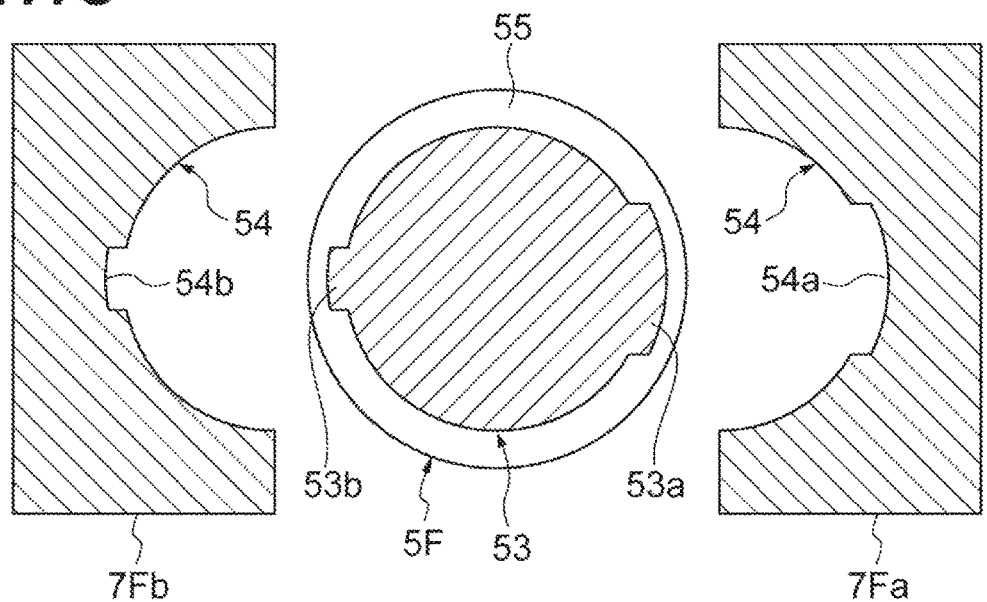
FIG. 11C is a cross-sectional view taken along XIC-XIC line of FIG. 11B.
Figure 12A:
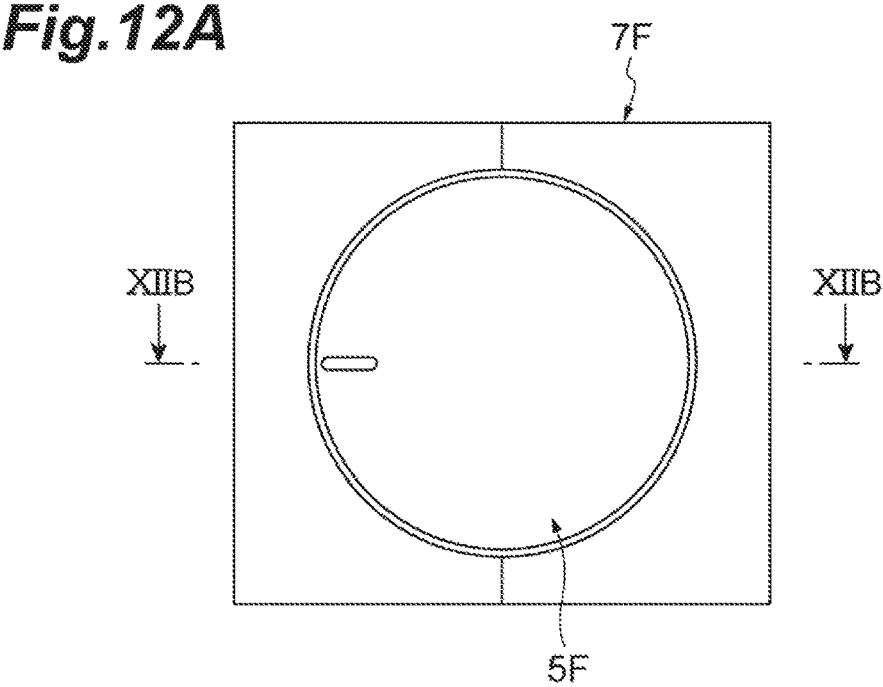
FIG. 12A is a bottom view of the attachment structure for the coil device illustrated in FIG. 11A.
Figure 12B:
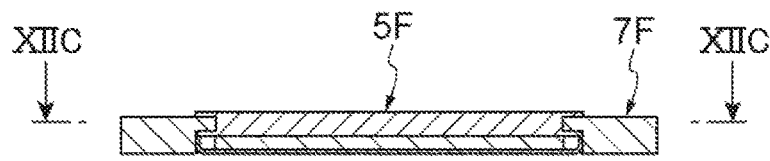
FIG. 12B is a cross-sectional view taken along XIIB-XIIB line of FIG. 12A.
Figure 12C:
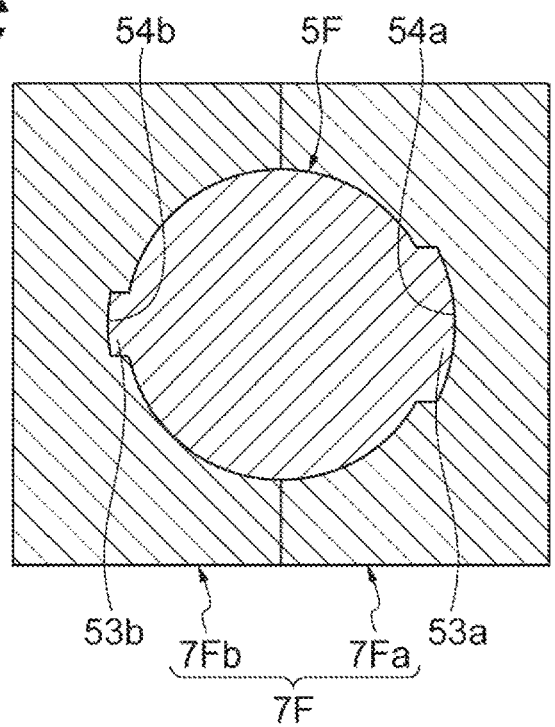
FIG. 12C is a cross-sectional view taken along XIIC-XIIC line of FIG. 12B.

Next, a description will be given of an attachment structure XF according to a sixth embodiment with reference to FIG. 11 and FIG. 12. As an aspect of the disclosure, it is possible to employ the attachment structure XF including an attachment portion 7F which is divided into two parts and includes a division plate 7Fa and a division plate 7Fb, and a coil device 5F provided with an engaged portion 53 between disc-shaped flange portions 55 and 55. A key way 54a is provided in a semi-circular arc-shaped holding portion 54 of the division plate 7Fa, and a key way 54b is provided in a semi-circular arc-shaped holding portion 54 of the division plate 7Fb. The key way 54a and the key way 54b have different sizes (widths). A key rib 53a matching the key way 54a and a key rib 53b matching the key way 54b are provided in the engaged portion 53.

At the time of fixing the coil device 5F, the coil device 5F is fit and fixed by enclosing a entire circumference as a regular position only when concavo-convex shapes of keys match each other. The attachment portion 7 may have a two-division structure or a multi-division structure. However, the concavo-convex shapes or positions of the keys are changed such that the coil device 5F may not be fixed at a position other than the regular position. For example, different shapes are formed as the key way 54a and the key way 54b, and the key rib 53a and the key rib 53b described above. According to the attachment structure XF having such an enclosing structure, the engaged portion 53 is engaged over the entire circumference thereof with the holding portion 54, and thus a fixing force for the coil device 5F may be evenly dispersed. In the present embodiment, the key way 54a and the key way 54b, and the key rib 53a and the key rib 53b correspond to a positioning portion.

Hereinbefore, the embodiments of the disclosure have been described. However, the invention is not restricted to the above-described embodiments. For example, the attachment portion 7 may not be made of iron, and may be made of another metal or resin when strength may be secured. With regard to the first to fifth embodiments, a description has been given of a case in which a female screw is formed in the attachment portion 7 and a male screw is formed in the housing 20 of the coil device 5. However, the invention is not restricted to this mode. For example, it is possible to employ an attachment portion which protrudes toward a coil device and in which a male screw is formed on an outer circumferential surface, and a coil device which accommodates the attachment portion and includes a housing in which a female screw is formed on an inner circumferential surface. In addition, with regard to the sixth embodiment, an arrangement relation of the key way (concave shape) of the holding portion 54 and the key rib (convex shape) of the engaged portion 53 may be reversed.

In the above-described embodiments, the power reception coil device 5 of the power receiver 3 has been described. However, the invention may be applied to the power transmission coil device 4 of the power transmitter 2. Only a portion of the coil device in the thickness direction may be accommodated inside the attachment portion 7. The stepped portion 34 may not be provided. Only a portion of the housing 20 in the thickness direction may be accommodated inside the attachment portion 7. In other words, a portion of the coil device 5 may protrude from the lower surface 7a of the attachment portion 7.

The invention is not restricted to a vehicle body of a vehicle driven on a road, and may be applied to another moving body such as an underwater sailing body.

INDUSTRIAL APPLICABILITY

According to some aspects of the disclosure, it is possible to evenly disperse a fixing force for a coil device.

REFERENCE SIGNS LIST 1 wireless power transfer system
2 power transmitter
3 power receiver
4 power transmission coil device
5 power reception coil device
5A coil device
5B coil device
5C coil device
5D coil device
5E coil device
5F coil device
7 attachment portion
7a lower surface (end surface in direction of axis L)
7B attachment portion
7C attachment portion
7D attachment portion
7E attachment portion
7F attachment portion
21 coil portion
21a side end portion
23 protective cover
23a side surface portion
24 cylindrical portion
24A cylindrical portion
24C cylindrical portion
24D cylindrical portion
24E cylindrical portion
32 holding portion
33 housing accommodation portion
40 engaged portion
41 coil portion
43 screw hole portion
45 mark
46 mark
47 groove portion
48 push block
49 screw hole portion
50 locking screw
51 magnet
52 magnet
53 engaged portion
53a key rib
53b key rib
54a key way
54b key way
54 holding portion
d1 first gap
d2 second gap
EV electric vehicle
L axis
R road
X1 attachment structure
X2 attachment structure
XB attachment structure
XC attachment structure
XD attachment structure
XE attachment structure
XF attachment structure

The invention claimed is:

1. An attachment structure for a coil device which attaches a flat coil device including a coil portion to an attachment portion, the attachment structure comprising:
   a cylindrical holding portion provided in the attachment portion to hold the coil device;
   a cylindrical engaged portion provided in the coil device and engaged with the holding portion, and
   a positioning portion configured to define a selected coil alignment position of the coil device in a rotation direction whereat a predetermined directivity of magnetic flux with respect to the coil portion is achieved and to fix the rotated coil device at the coil alignment position,
   wherein the holding portion and the engaged portion are disposed along an axis extending in a thickness direction of the coil device, and the engaged portion is engaged over the entire circumference thereof with the holding portion;
   wherein a screw thread portion is provided on a peripheral surface of the holding portion and on a peripheral surface of the engaged portion, respectively, and
   the coil device is fixed to the attachment portion by the engaged portion being screwed into the holding portion by rotation of the coil device around the axis; wherein:
   the positioning portion has a first positioning portion provided in the attachment portion and a corresponding second positioning portion provided in the coil device;
   the first positioning portion and corresponding second positioning portion being of the form of:
   a first mark and a corresponding second mark,
   a grove and corresponding push block, an alignment hole and corresponding alignment hole, or a magnet and corresponding magnet, the coil device has a target position in the rotation direction corresponding to the selected coil alignment position, and the coil device is positionally fixed at the target position to the attachment portion such that the first positioning portion aligns with the second positioning portion whereby the coil device is in the coil alignment position.

2. The attachment structure according to claim 1, wherein the holding portion is provided in a region recessed from an end surface of the attachment portion in a direction of the axis, and a portion or a whole of the coil device in a thickness direction is buried inside the attachment portion.

3. The attachment structure according to claim 2, wherein the holding portion with which the engaged portion is engaged, and a housing accommodation portion which has a larger diameter than a diameter of the holding portion and accommodates a portion or a whole of a housing of the coil device are provided in the attachment portion.

4. The attachment structure according to claim 3, wherein a side of the coil portion accommodated in the housing is separated from an inner side of the housing by a first annular gap in a direction orthogonal to the axis, wherein an outer side of the housing is separated from a peripheral surface of the housing accommodation portion in the orthogonal direction by an annular second gap, and the first gap is larger than the second gap.

5. The attachment structure according to claim 4, wherein the housing accommodation portion is made of a magnetic member.

6. An electric vehicle comprising the attachment structure according to claim 1 mounted on an underside of the vehicle as part of a power receiver.

7. A power transmitter configured for disposition at a selected location over which an electric vehicle can be disposed for power reception comprising the attachment structure according to claim 1.

8. The attachment structure according to claim 1, wherein the first positioning portion and corresponding second positioning portion are of the form of a first mark and a corresponding second mark such that the coil device is positionally fixed to the attachment portion with a predetermined torque at which the first mark aligns with the second mark.

9. The attachment structure according to claim 1, wherein the first positioning portion and corresponding second positioning portion are of the form of a grove and corresponding push block such that the coil device is positionally fixed to the attachment portion by engagement of the push block within the groove.

10. The attachment structure according to claim 1, wherein the first positioning portion and corresponding second positioning portion are of the form of an alignment hole and corresponding alignment hole such that the coil device is positionally fixed to the attachment portion by a locking screw that engages both alignment holes.

11. The attachment structure according to claim 1, wherein the first positioning portion and corresponding second positioning portion are of the form of a magnet and corresponding magnet such that the coil device is positionally fixed to the attachment portion by a magnetic field between the magnets.

* * * * *